United States Patent Office 3,018,624  
Patented Jan. 30, 1962

3,018,624  
FLAME TUBES FOR USE IN COMBUSTION SYSTEMS OF GAS TURBINE ENGINES  
Frank Bonsall and Bernard Sidney Massey, Bristol, England, assignors, by mesne assignments, to Bristol Siddeley Engines Limited, Bristol, England, a British company  
Filed Feb. 28, 1955, Ser. No. 491,098  
Claims priority, application Great Britain Mar. 2, 1954  
3 Claims. (Cl. 60—39.37)

This invention relates to flame tubes for use in the combustion systems of gas turbine engines.

Hitherto such flame tubes have comprised a body part enclosing a space for combustion of fuel and an integral or separate outlet passage part whereby the hot gases are directed to pass through a row of nozzle guide blades carried independently of the flame tube by inner and outer ring-shaped members supported in a manner allowing for differential expansion, by the non-rotating structure of the turbine.

The object of the present invention is to provide a simplified flame tube and nozzle guide blade assembly whereby the cost and weight of the equipment is substantially reduced.

According to the invention a flame tube unit comprises a body part defining at least part of a combustion space, an outlet passage part for receiving hot gases from the combustion space, said outlet passage part including spaced concentric walls, and a plurality of turbine-nozzle guide blades extending between and carried by said concentric walls.

An assemblage as above defined may constitute a unit in the sense that it is removable from an engine as a whole or in the sense that all parts are connected together in a permanent manner, as for example, by welding or riveting.

The body part may itself enclose a space for combustion of fuel, or it may be so shaped that when the flame tube unit is assembled with a number of other flame tube units in accordance with the invention, the body parts of all the units together enclose an annular space for the combustion of fuel.

Preferably, the spaced concentric walls of the outlet passage part each subtend a common angle and the body part is so shaped, dimensioned and arranged in relation to the outlet passage part, that a number of the units, the concentric walls of the outlet passage parts of which subtend angles which together make up 360°, may be arranged with their outlet passage parts in juxtaposition to form a complete annulus with all the outlets from the outlet passage parts facing in the same direction. Preferably, the common angle is a sub-multiple of 360° so that a number of the units, the concentric walls of the outlet passage parts of which each subtend the same angle, may be arranged in juxtaposition to form a complete annulus with all the outlets of the outlet passage parts of the units facing the same direction. It will be appreciated, however, that a number of units arranged with their outlet passage parts in juxtaposition as aforesaid need not have the concentric walls of their outlet passage parts subtending the same common angle provided that the common angles add up to 360°. Thus, the concentric walls of the outlet passage parts of three of the units could subtend a common angle of 70° and a further three of the units could have the concentric walls of their outlet passage parts each subtending a common angle of 50°.

According to a feature of the invention, said body part may define the whole of a combustion space, in which case the body part of the unit is shaped, dimensioned and arranged so as to remain spaced from the body parts of adjacent units when a number of units are arranged with their outlet passage parts in juxtaposition as aforesaid.

Flame tube units of this form are suitable for use either in combustion systems of the kind including a number of separate air casings disposed in spaced relation around the shaft axis of an engine or in systems of the kind including inner and outer concentric air casings defining an air passage of annular cross-section.

According to another feature of the invention, when the first mentioned feature is adopted, the body part may be substantially circular, and the outlet passage part may be shaped as segments of annuli in sections taken normal to the direction of gaseous flow through the unit, in which case, the unit further comprises a transitional part of transitional cross-sectional shape communicating the body part with the outlet passage part.

Two embodiments of the present invention will now be described merely by way of example with reference to the accompanying drawings, in which:

FIGURE 1 is a stepped section longitudinally through one flame tube unit according to the invention, the unit comprising a substantially cylindrical body part, a transitional part and an annular-segment-shaped outlet passage part, the plane of section passing through the axis of the body part and then being stepped circumferentially to pass, looking in the downstream direction, close to the left hand side wall of the outlet passage part, the plane of the section being taken between the first pair of turbine guide blades adjacent said left hand side wall;

Figure 1:
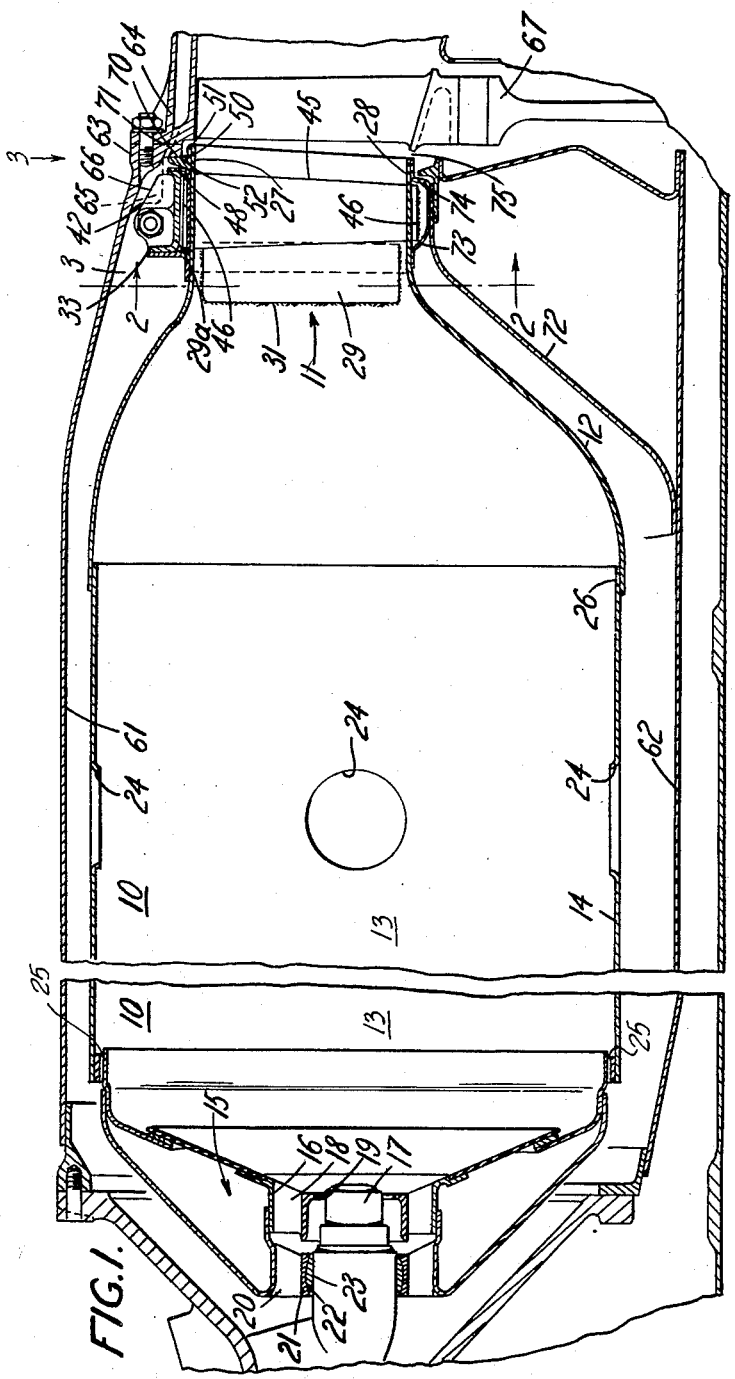
Figure 2:
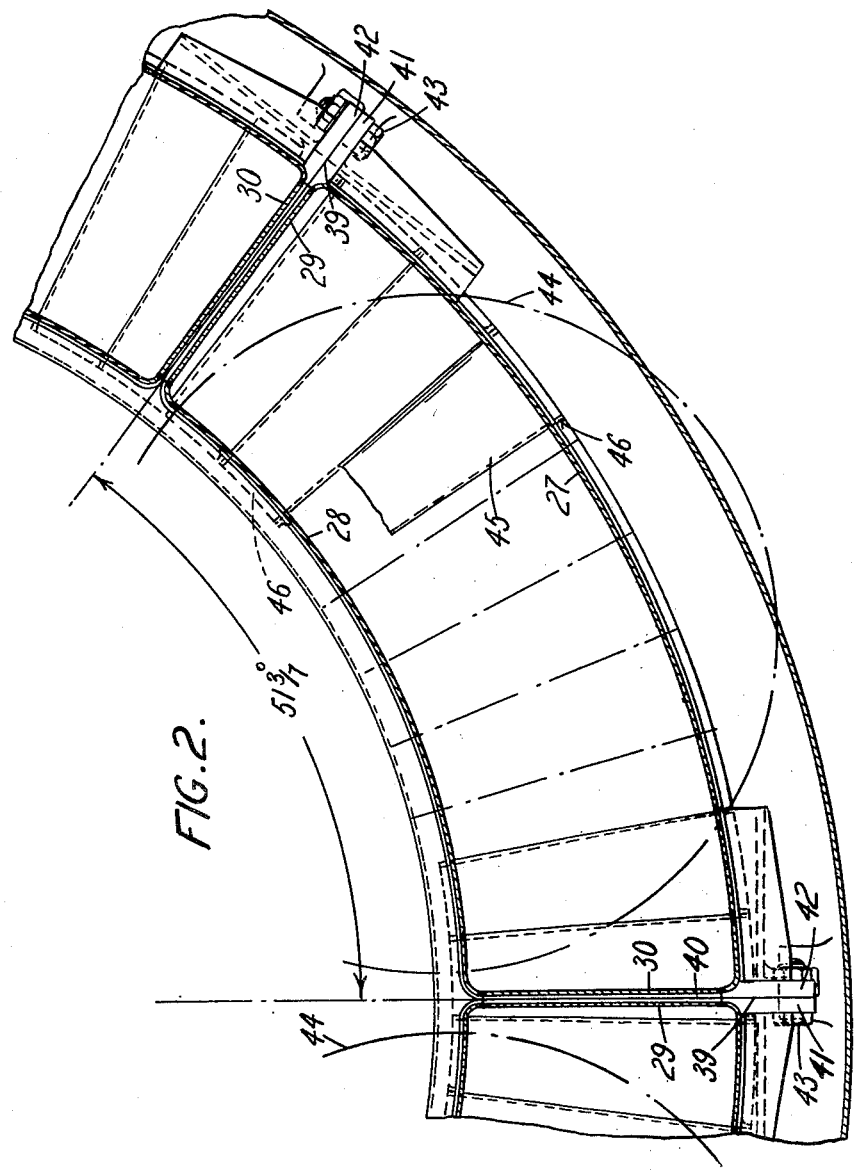
FIGURE 2 is a transverse section along the line 2—2 in FIGURE 1, showing three of the units of FIGURE 1 joined together, the two end units being shown in part only.
Figure 3:
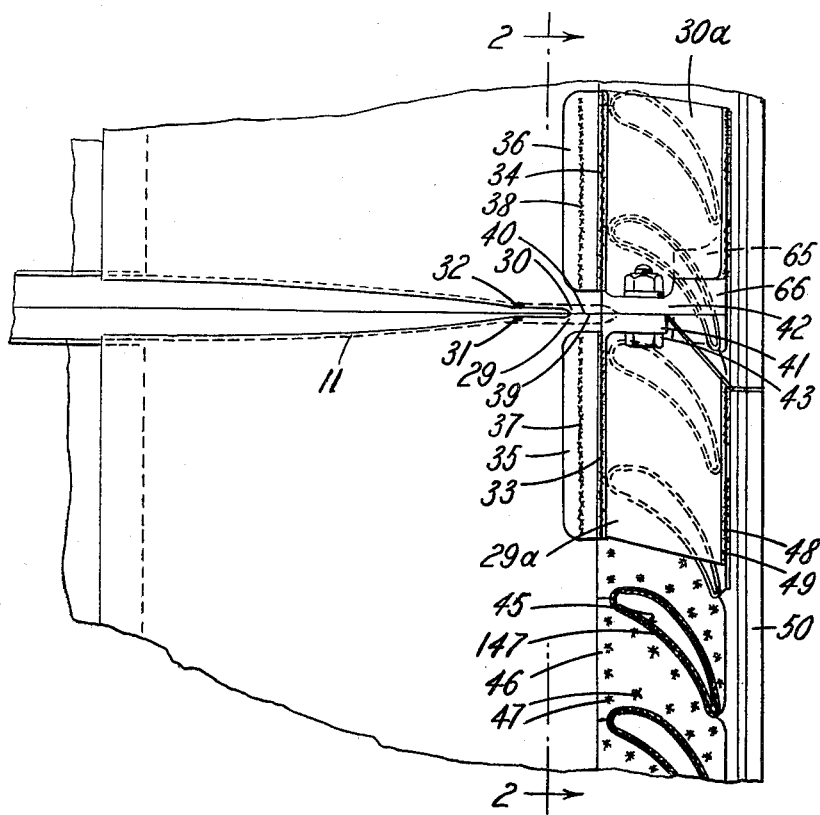
FIGURE 3 is a view in the direction of the arrow 3 in FIGURE 1, showing parts of two of the units of FIGURE 1 joined together.

Referring firstly to FIGURES 1 to 3, each flame tube unit there shown comprises a body part indicated generally by the reference numeral 10, an outlet passage part indicated generally by the numeral 11, and an intermediate transitional wall part 12 communicating the body part with the outlet passage part. Each body part 10 encloses a separate combustion space 13 and is composed of a cylindrical shell 14 and a conical nose structure 15 having a central opening 16 through which projects an atomising burner 17. Swirl vanes 18 project from the wall of the opening 16 to a ring 19 closely surrounding the outlet end of the burner 17, and a further set of vanes 20 extend to a ring 21, the inner surface of which is of part spherical shape and houses spherically surfaced bearing elements 22 sliding upon a cylindrical surface 23 formed upon the burner 17. The burner thus supports the forward end of the flame tube unit in a manner allowing for angular or endwise movements. Primary air for the combustion of fuel sprayed into the chamber through the burner 17 enters through the opening 16, while secondary air is admitted through holes 24 provided in the cylindrical shell 14 and through spaces 25 formed between this shell and the conical nose structure 15.

The intermediate wall part 12 is circular in shape at its forward end, where it is permanently connected by a welded seam 26 to the rear end of the cylindrical shell 14, and is shaped as a segment of an annulus at its rear end, where it has inner and outer spaced concentric walls rearward extensions 27 and 28 of which form the inner and outer walls of the outlet passage part 11. The radially extending side walls of the part 11 are formed by side wall members 29 and 30 which are welded as indicated at 31, 32 to the radially extending side walls of the rearward end of the transitional part 12.

The members 29 and 30 have integral parts 29a and 30a respectively which overlie part of the outer concentric wall portion 27 and are welded at 33, 34 to angle pieces 35 and 36, which are themselves welded at 37, 38 to the intermediate wall portion 12. This arrangement helps in stiffening the outlet part of the unit. The members 29 and 30 are provided with flat sealing faces 39 and 40 which are arranged to engage corresponding flat faces on the corresponding parts of the adjacent flame tube units as shown in FIGURE 3 so that a seal is provided between them. These flat faces also extend uninterruptedly over surfaces of lugs 41 and 42 which are formed on the parts 29a and 30a so as to be upstanding therefrom on the side remote from the wall 28, the lugs being provided with holes for a nut and bolt 43 to hold the adjacent units together. As shown in FIGURE 2, the faces 39 and 40 at opposite sides of the flame tube unit lie in planes arranged at an included angle which is one seventh of 360°, i.e. 51 3/7°, so that seven units arranged with their faces 39 and 40 in juxtaposition form a complete outlet passage which is a circular annulus. In FIGURE 2, also, the chain-dotted circles 44 indicate the body portions of the flame tube units as seen in the axial direction, and it will be seen that they remain spaced from one another on opposite sides of the planes 39 and 40. It is to be understood, however, that the flame tube units are not necessarily comprised between flat planes such as 39 and 40 but that these planes may be bent or twisted, for example, so that the body portions of the flame tube units are approximately helically arranged with reference to the concentric axis of the inner and outer walls of the outlet part 11.

The outer and inner concentric walls 27 and 28 of the outlet passage part are perforated to receive the ends of a row of hollow sheet metal turbine-nozzle guide blades 45 arranged in equally spaced relation so as to form a complete circle of blades when a set of seven flame tube units are bolted up together. The ends of the blades are attached to the walls 27 and 28 by means of sheet metal members 46 which are spot welded to the walls as indicated at 47 and have upturned flanges lying alongside the parts of the blades which project beyond the walls, the edges of these flanges and the edges of the blades being welded together as indicated at 147. This method of attaching hollow blades to a supporting member is more fully described in the specification accompanying United States Patent Application Serial No. 407,053, now Patent No. 2,924,425. As shown in FIGURES 1 and 3, the blade attachment members 46 which underlie the parts 29a and 30a of the side wall members are also provided with flanges 48 welded to flanges 49 on the latter. Thus, the parts 29a and 30a together with the wall 27 members 46 with flanges 48 and angle pieces 35 form a box-like structure with open ends which effectively stiffen the outlet passage part of the unit. The outlet edge of the outer concentric wall 27 is also further stiffened by an angle section strip 50 welded to it at 51, the member 50 providing an annular abutment face 52 which takes the thrust of the flame tube unit as presently more fully described.

In this example, the set of flame tube units is contained within an air casing having an outer substantially cylindrical wall 61 and an inner concentric substantially cylindrical wall 62. The outer cylindrical wall has at its rear end a thickened flange part 63 by which it is secured to a hollow turbine stator casing 64 housing a turbine rotor 67. Opposite the joint faces 39, 40 of each pair of adjacent flame tube units the flange 63 is provided with a pair of projecting lugs 65 which embrace between them a thickened abutment part 66 providing a pair of opposed surfaces directed transversely of the unit, the part 66 being formed as an extension of the connecting lugs 42 of the units. The set of flame tube units is thus allowed freedom to expand and contract relatively to the outer casing 61 while being effectively held concentric with the axis of the air casing and being prevented from transverse movement, i.e. rotation relatively to the air casing.

The resultant thrust of the gases in and around the set of flame tube units upon the latter is in the rearward direction and since the units are freely mounted for axial movement at their forward ends on the burners 17, this thrust is resisted by the abutment face 52 of the angle section member 50 engaging an annular face 70 provided on the flange part 63. The engagement of these faces also provides a peripheral seal so that the relatively cooler air in the space between the flame tube units and the air casing 61 can only escape through the hollow guide blades 45 the air entering the guide blades through their outer open ends (see FIGURE 3) and passing through the guide blades and then through a number of small passages 71 into the hollow turbine stator 64.

The inner air casing 62 is provided at its rear end with a conically shaped part 72 following the general contour of the flame tubes as seen in longitudinal section. In the region of the outlet passage parts of the flame tubes the part 72 forms a fairly effective seal with a U-section member 73 welded to the underside of the inner concentric wall of each flame tube unit. These U-section members, forming together a complete ring, straddle the inner projecting ends of the hollow guide blades 45 and receive the relatively cool air which has entered the outer ends of the blades as already described, this air being allowed to escape through holes 74 arranged on the downstream side of the seal formed between the parts 72 and 73 and finally entering the main working fluid passage of the turbine through the gap 75 between the rearward ends of the flame tube units and the turbine rotor 67. In this way, a useful reduction in the working temperature of the guide blades is obtained.

FIGURES 4 to 9 illustrate another flame tube unit in accordance with the invention, in which the construction, compared with the unit described with reference to FIGURES 1 to 3, is simplified. The following is a description of the simplified unit and this description is confined in the main to the differences between the first construction and the simplified construction, the same reference numerals as before being used to indicate those parts of the simplified unit which are common to both constructions.

Figure 4:
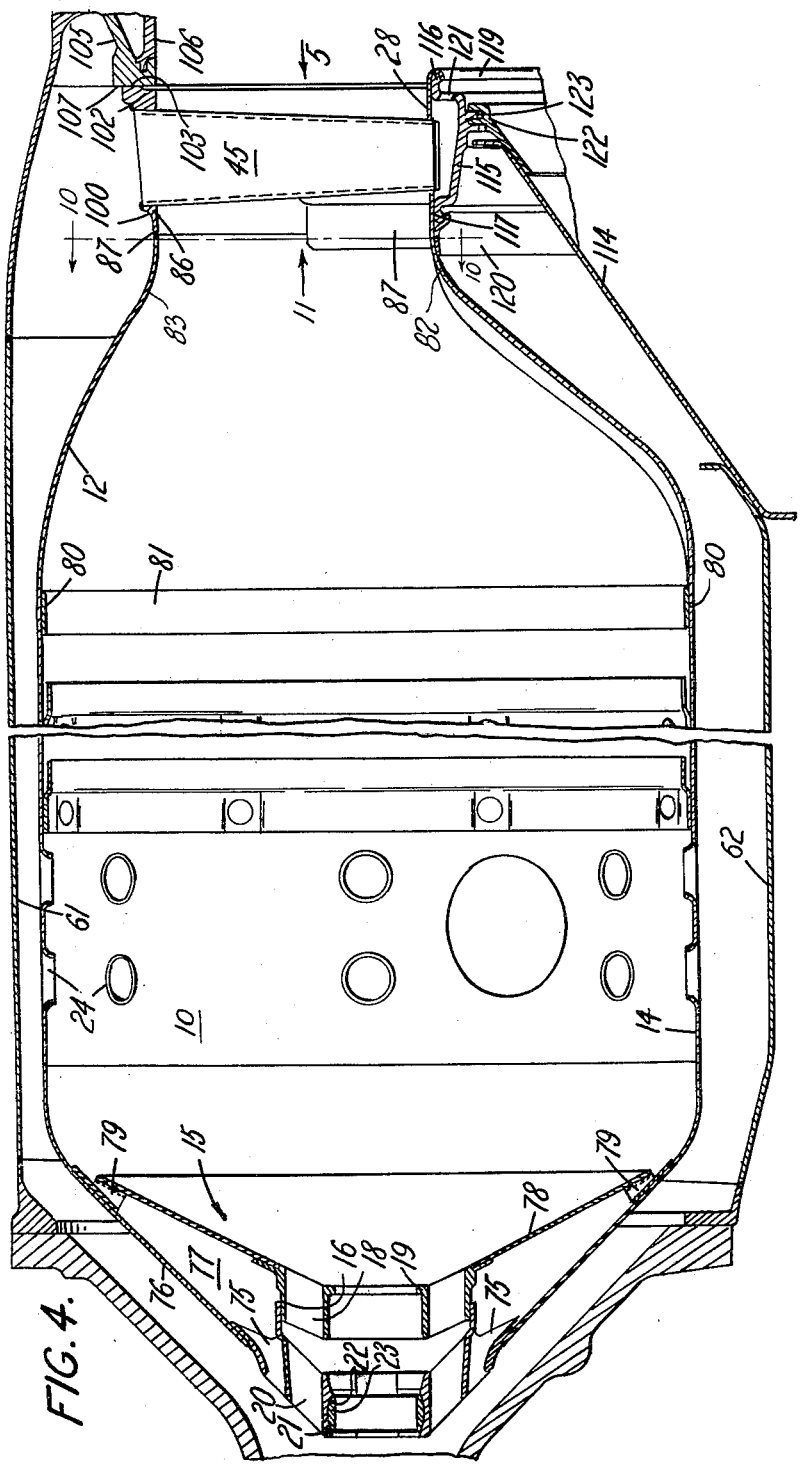
FIGURE 4 is a longitudinal section taken through the axis of another flame tube unit according to the invention, the unit again comprising a substantially cylindrical body part, a transitional part and an annular-segment shaped outlet passage part.

Thus, referring to FIGURE 4, the simplified unit comprises a body part 10, an outlet passage part 11 and a transitional part 12. The body part 10 as before encloses a separate combustion space 13 and is composed of a cylindrical shell 14 in this case, having an integral nose structure 15. As before the nose structure 15 has a central opening 16 for an atomising burner, which in this case is not shown and the arrangement for mounting the burner is the same. In addition to the air passages between the vanes 20 and 18, however further air passages are provided between vanes 75 projecting from the wall of the opening 16 to the bounding wall 76 of the nose structure, these passages leading into a space 77 defined between the wall of the opening 16, the bounding wall 76 and truncated conical plate member 78 forming a divergent passageway extending from the opening 16, and further air passageways being formed between swirl vanes 79 extending between the wall 76 and a peripheral edge portion of the member 78, these passageways directing air from the space 77 along the inner surface of the cylindrical shell 14.

Figure 10:
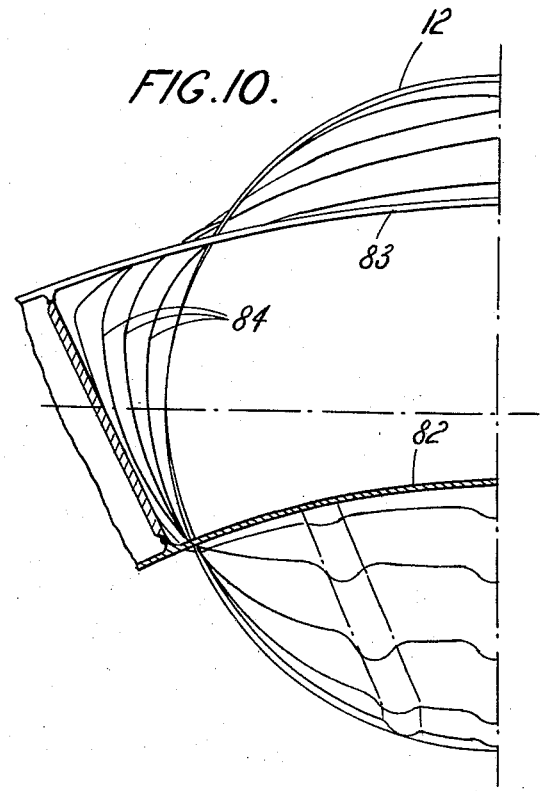
FIGURE 10 is a diagram showing in partial end view the shape of the transitional part of the unit of FIGURE 4 taken on line 10—10 in FIGURE 4.

The transitional part 12 is circular in shape at its forward end is particularly shown in FIGURE 10 and is connected to the rear end of the shell 14 by a butt weld 80, a reinforcing ring 81 overlapping the butt joint on the inside and also being welded in position. At its rear end the transitional part is shaped as a segment of an annulus where it has inner and outer spaced concentric walls 82, 83 (see FIGURE 10) and between its ends has transitional cross-sectional shapes as indicated by the lines 84 in this figure.

Figure 8:
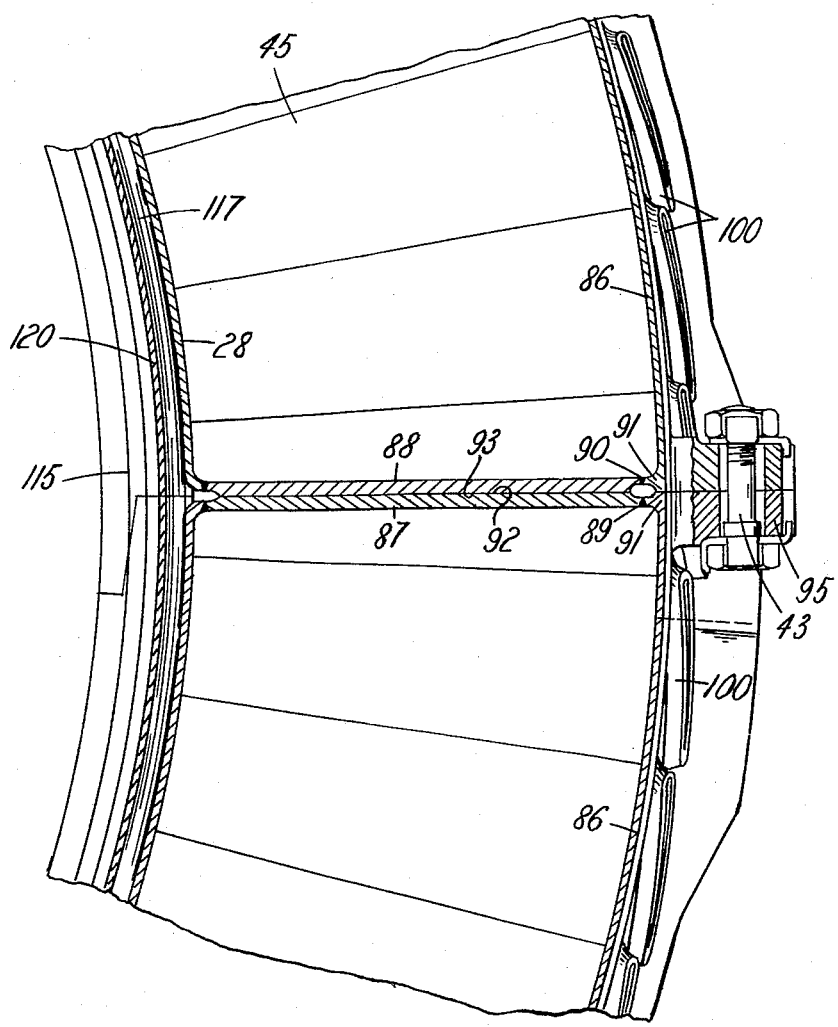
FIGURE 8 is a transverse section on line 8—8 in FIGURE 7 showing parts of two of the units of FIGURE 4 joined together.
Figure 9:
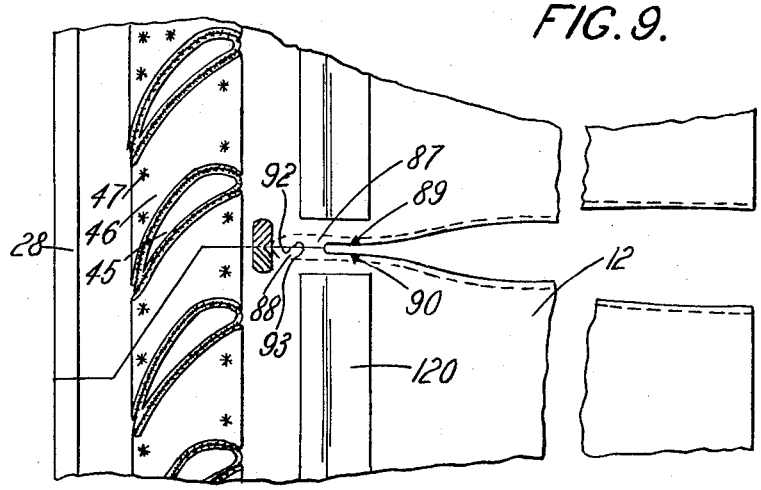
FIGURE 9 is a view in the direction of arrow 9 in FIGURE 5.

The inner concentric wall 82 has a rearward extension which forms the inner concentric wall 28 of the outlet passage part 11 as before while the outer concentric wall of the part 11 is formed by a separate rigid precision cast segment 86 butt welded as at 87, to the rear edge of the wall 83 of the part 12. The radially extending side walls of the part 11 are formed by members 87 and 88 (see FIGURES 7 and 8) welded as at 89, 90 to the radially extending walls at the rearward end of the part 12, and to depending flanges 91 on the segment 86. The members 87, 88 are provided with flat sealing faces 92, 93 which are arranged to engage corresponding flat faces on the adjacent flame tube units as shown in FIGURE 8, so that a seal is provided between them. These flat faces also extend uninterruptedly over surfaces of lugs 95, 96 which are formed integrally with the segment 86 so as to be upstanding from the outside thereof, the lugs being provided with bores to receive a nut and bolt 43 to hold the adjacent units together.

Figure 5:
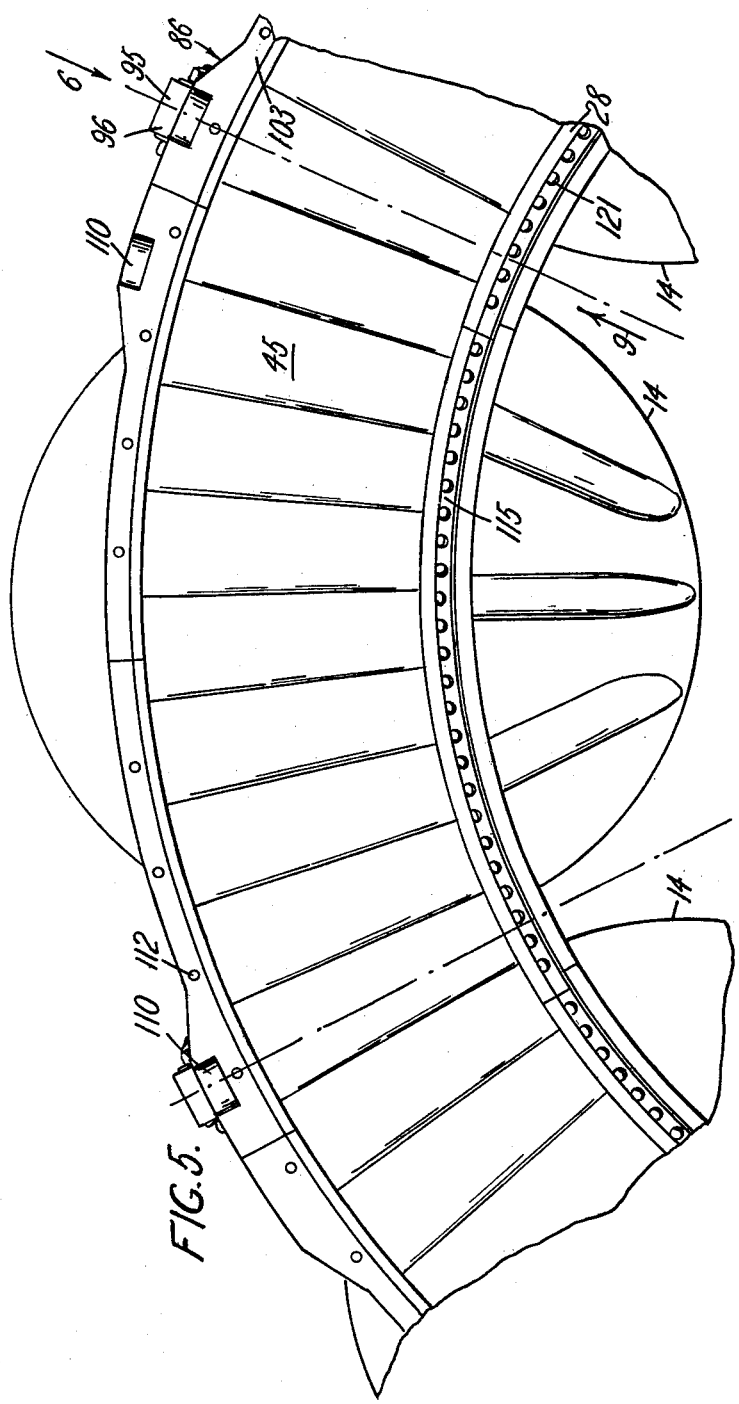
FIGURE 5 is a view in the direction of arrow 5 in FIGURE 4 showing in end view three of the units of FIGURE 1 joined together, the two end units being shown in part only.
Figure 6:
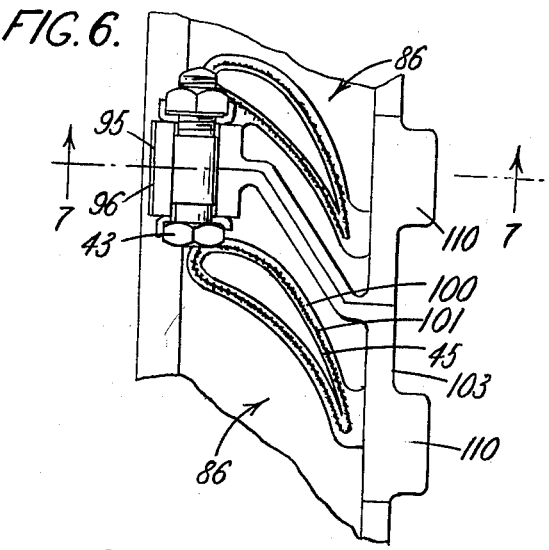
FIGURE 6 is a view in the direction of arrow 6 in FIGURE 5.
Figure 7:
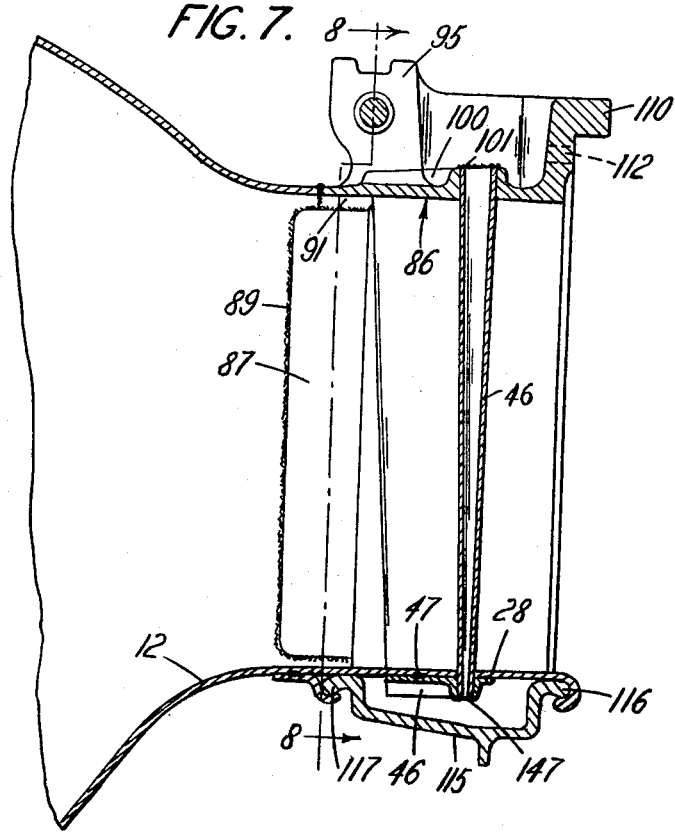
FIGURE 7 is a view on line 7—7 in FIGURE 6.

As shown in FIGURE 5, the faces 92, 93 at opposite sides of each flame tube unit lie in planes which include an angle which is one seventh of 360° so that seven units arranged with their faces 92, 93 in juxtaposition form a complete outlet passage which is a circular annulus. In FIGURE 5 is also shown the cylindrical shells 14 of the flame tube units as seen in the axial direction, and it will be seen that they remain spaced from one another on opposite sides of the planes containing the faces 92, 93.

The segment 86 and the inner concentric wall 28 of the part 11 are perforated to receive the outer and inner ends of a row of hollow sheet metal turbine-nozzle guide blades arranged in equally spaced relation so as to form a complete circle of blades when seven of the units are bolted up together, the perforations corresponding in shape to the shape of the blades in cross-section. The inner ends of the blades of each unit are attached to the wall 28 of the outlet passage part of the unit as previously described. At their outer ends the blades 45 each have their edge flush with a raised lip 100 (see FIGURE 7) formed integrally with the segment 86 around the perforations which receives the outer end of the blade, and the edge of the blade is welded to the lip as at 101.

The segment 86 has a thickened rim 102 along the whole of its rear edge which provides an abutment face 103 which takes the thrust of the unit, the rims 102 on a set of seven units when assembled together providing an annular abutment surface which also acts as a sealing face.

As previously described, a set of seven of the units now being described are intended to be contained within an annular air casing having an outer substantially cylindrical wall 61 (see FIGURE 4), and an inner concentric substantially cylindrical wall 62. The rear end of the wall 61 is attached to an outer turbine casing which has a ring-like extension 105 extending forwardly within the outer wall 61 of the air casing. The ring-like extension has a thickened rim which is adapted to support the forward end of a turbine stator casing 106 housing a turbine rotor (not shown), and has a forwardly facing annular abutment face 107 against which the abutment faces 103 on the flame tube units abut. The rim is also provided with recesses to receive locating dogs 110 (see FIGURES 5, 6 and 7) projecting rearwardly from the segments 86 of a set of units. The units of a set are thus allowed freedom to expand and contract relatively to the outer air casing while being effectively held concentric with respect to the axis of the air casing and being prevented from transverse movement.

The resultant thrust of the gases in and around the set of flame tube units upon the units is in the rearward direction, and since the units are freely mounted for axial movement at their forward ends (on the atomising burners) this thrust is taken on the abutment face 107. The engagement between the face 107 and the faces 103 also provides a peripheral seal around the outside of the set of units between the air casing and the turbine. This seal ensures that the majority of the relatively cooler air around the outside of the flame tube units and between the units and the outer wall 61 of the air casing passes into the open ends of the blades 45 and through the blades to cool them. A number of small passages 112 (see FIGURE 5) are provided, however, through which air is allowed to pass into the turbine stator casing 106, appropriate passages being provided in the abutment face 107.

The inner wall 62 of the air casing is provided at its rear end with a conically shaped part 114 following the general contour of the flame tubes as seen in longitudinal section. At its rearward edge the part 114 carries a grooved member 122 containing a "piston ring" 123 which is pressed by a light backing spring (not shown) into sealing engagement with generally U-section members 115 attached one to the outer side of the inner concentric wall 28 of the outlet part 11 of each of the units so as to straddle the open ends of the blades 45. The U-section members 115 are precision castings and are formed with outwardly directed flanges 116, 117 at the tops of their side walls, the rearward flange being entered and located in a fold 119 in the rear edge of the extension forming the wall 28 and the forwardly extending flange being secured against the wall 28 by means of a joggled strip 120 welded to the wall 28.

The members 115 of a set of seven units assembled together abut one another to define with the walls 28 of the outlet parts of the units an annular chamber which receives the cooling air passing through the hollow blades 45 and this air is discharged from the chamber through holes 121 downstream of the seal between the members 115 and the part 114 of the inner wall 62 of the air casing and entering the working fluid duct through the turbine.

In each of the constructions described, it will be noted that the butt joints between the outlet passage parts of the units assembled in a set are made oblique to the direction of gas flow so that they may be accommodated between an adjacent pair of blades 45 one on one unit, and the other on another unit.

During the assembly of an engine, a set of seven flame tube units as described with reference to FIGURES 1 to 3 or 4 to 9 may be connected together by the bolts 43 and then inserted endwise as an assembly into the annular air passage formed between the walls of the air casing, the assembly being withdrawn in the same way as and when necessary. Alternately a completely annular flame tube and ring of turbine-nozzle guide blades could be made as a single unit for insertion into and withdrawal from the annular air passage, or again, the individual units of a set may first be inserted into the annular air passage, the units being bolted together by the bolts 43 after being located in their required positions.

We claim:

1. A flame tube for a gas turbine engine constructed to be one of a circular series of such flame tubes for symmetrical disposition around a common axis, comprising a flame tube body part having an outlet passage portion permanently connected to the body part and of section defined by two substantially radial walls, concentric inner and outer arcuate walls, and a plurality of turbine nozzle blades extending between and carried by said inner and outer walls, said spaced concentric walls of the outlet passage part, each subtending to a common angle, and the body part being so shaped, dimensioned and arranged in relation to the outlet passage part, that a number of the flame tubes, the concentric walls of the outlet passage parts of which, subtend angles which together make up 360° can be arranged with their outlet passage parts in juxtaposition to form a complete annulus with all the outlets from the outlet passage parts facing in the same direction, and each flame tube also comprising a pair of attachment lugs upstanding from the outer concentric wall of the outlet passage part, said lugs each being bored to receive bolts for attaching the flame tube to each of its adjacent flame tubes when a number of the flame tubes are arranged in juxtaposition as aforesaid, one of said attachment lugs having a part which provides a pair of opposed surfaces directly transversely of the flame tube whereby the flame tube may be located transversely.

2. A flame tube for a gas turbine engine constructed to be one of a circular series of such flame tubes for symmetrical disposition around a common axis, comprising a flame tube body part having an outlet passage portion permanently connected to the body part and of section defined by two substantially radial walls concentric inner and outer arcuate walls, and a plurality of turbine nozzle blades extending between and carried by said inner and outer walls, said spaced concentric walls of the outlet passage part each subtending a common angle, and the body part being so shaped, dimensioned and arranged in relation to the outlet passage part, that a number of the flame tubes, the concentric walls of the outlet passage parts of which, subtend angles which together make up 360°, can be arranged with their outlet passage parts in juxtaposition to form a complete annulus with all the outlets from the outlet passage parts facing in the same direction, each flame tube also comprising a pair of attachment lugs upstanding from the outer concentric wall of the outlet passage part, and lying in planes radial of the axis of the circular assembly of flame tubes, said lugs each being bored to receive bolts for attaching the flame tube to each of its adjacent flame tubes when a number of the flame tubes are arranged in juxtaposition as aforesaid, one of said attachment lugs having a part which provides a pair of opposed surfaces directed transversely of the flame tube whereby the flame tube may be located transversely, but left free to expand radially.

3. In combination in a gas turbine engine, a plurality of flame tube units, each flame tube unit constructed to be one of a circular series of such units for symmetrical disposition around a common axis, comprising a body part having an outlet passage part section defined by two substantially radial walls, concentric inner and outer arcuate walls, a plurality of turbine nozzle blades extending between and carried by said inner and outer walls, said spaced concentric walls of the outlet passage part each subtending a common angle, and the body part is so shaped, dimensioned and arranged in relation to the outlet passage part, that a number of the units, the concentric walls of the outlet passage parts of which, subtend angles which together make up 360°, may be arranged with their outlet passage parts in juxtaposition to form a complete annulus with all the outlets from the outlet passage parts facing in the same direction, said flame tube units being arranged with their outlet passage parts in juxtaposition as aforesaid, and a turbine structure whereof the turbine is connected to receive directly combustion gases from said annulus, such structure including mounting means for said units permitting their withdrawal from the engine individually of one another.

References Cited in the file of this patent

UNITED STATES PATENTS

| | | |
|---|---|---|
| 2,479,573 | Howard | Aug. 23, 1949 |
| 2,548,886 | Howard | Apr. 17, 1951 |
| 2,608,057 | Boyd et al. | Aug. 26, 1952 |
| 2,614,384 | Feilden | Oct. 21, 1952 |
| 2,630,679 | Sedille | Mar. 10, 1953 |
| 2,676,460 | Brown | Apr. 27, 1954 |
| 2,709,338 | Morley et al. | May 31, 1955 |
| 2,711,074 | Howard | June 21, 1955 |
| 2,711,631 | Willgoes | June 28, 1955 |
| 2,741,090 | Johnson | Apr. 10, 1956 |
| 2,743,579 | Gaubatz | May 1, 1956 |
| 2,775,094 | Buckland et al. | Dec. 25, 1956 |

FOREIGN PATENTS

| | | |
|---|---|---|
| 656,930 | Great Britain | Sept. 5, 1951 |
| 661,078 | Great Britain | Nov. 14, 1951 |